Jan. 1, 1924
W. G. KUEHN
CONDUIT AND MOUNTING
Filed Nov. 4, 1921
1,479,470
2 Sheets-Sheet 1
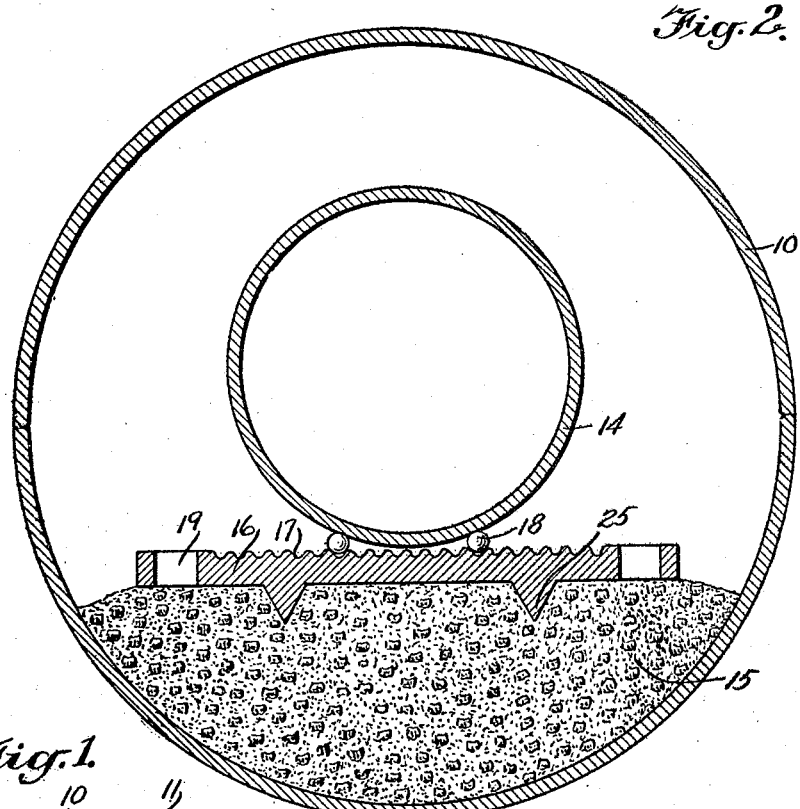
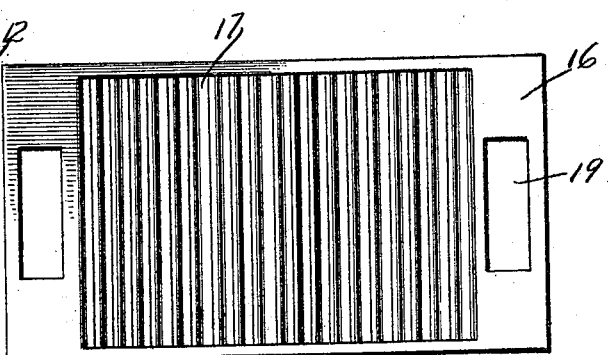
WITNESSES
INVENTOR
WILLIAM G. KUEHN
BY
ATTORNEYS Jan. 1, 1924. 1,479,470
W. G. KUEHN
CONDUIT AND MOUNTING
Filed Nov. 4, 1921 2 Sheets-Sheet 2
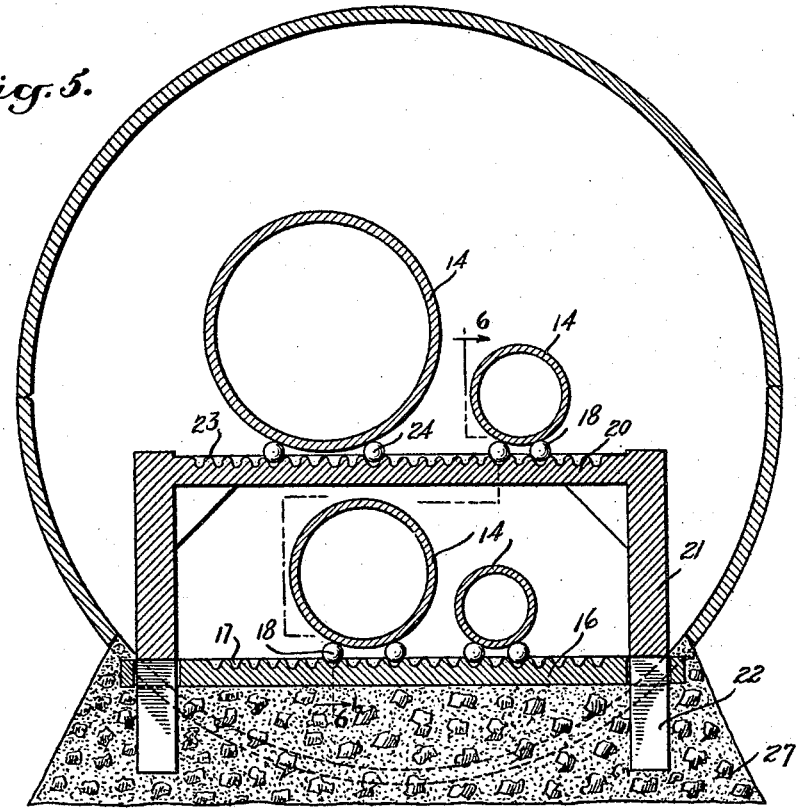
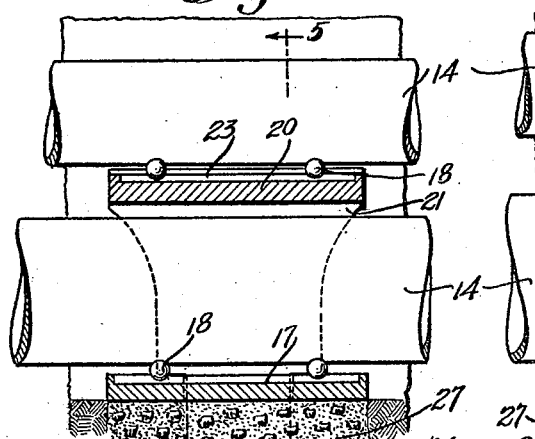
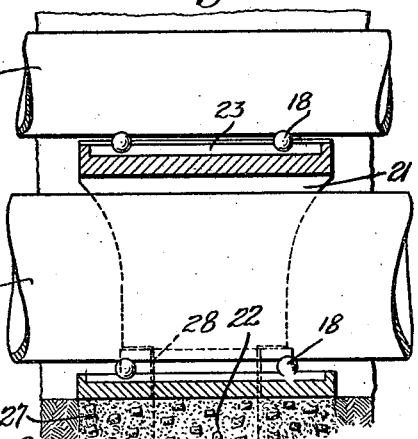
INVENTOR
William G. Kuehn
BY
ATTORNEYS Patented Jan. 1, 1924.

1,479,470

UNITED STATES PATENT OFFICE.

WILLIAM GEORGE KUEHN, OF NEW YORK, N. Y., ASSIGNOR TO JOHNS-MANVILLE INCORPORATED, A CORPORATION OF NEW YORK.

CONDUIT AND MOUNTING.

Application filed November 4, 1921. Serial No. 512,753.

*To all whom it may concern:*

Be it known that I, WILLIAM G. KUEHN, a citizen of the United States, and resident of the city of New York, borough of Bronx, county of New York, and State of New York, have invented a new and Improved Conduit and Mounting, of which the following is a full, clear, and exact description.

My invention relates to a conduit and mounting, and aims to provide certain new and useful improvements in connection with devices of this character.

It is a well appreciated fact that it has been customary in the transmission of steam, and similar lines, for a construction company to provide a conduit which would act as a protective, and insulating housing for pipe lines extending therein, the said conduit being in the nature of a tunnel for these pipe lines.

Due to the expansion and contraction of these pipe lines incident to the heat to which they are subjected, they have set up a "creeping" action and it has thus been necessary to provide a mounting within the conduit which would serve as a movable support for said device.

These mountings have offered considerable objection incident to the fact that they were extremely susceptible to "freezing" i. e. the rollers do not turn freely, and further for the reason that numerous sizes of mounting frames have to be carried in stock to accommodate the various sizes of pipe lines positioned within the conduits.

With this in mind, my present invention aims to provide a conduit mounting in which the mounting may be erected with a minimum of trouble, and expense, and which will at all times serve to properly and movably support the pipe lines within the conduit.

A further object of my invention is the construction of a device of the character stated which shall be capable of accommodating various sizes of pipe and in which certain units are utilized regardless of whether the pipe lines are disposed in single, double, or more, deck arrangement.

Still further objects of this invention will become apparent in the annexed specification taken in connection with the drawings which latter present one practical embodiment of the same, and in which;

Figure 1 illustrates a conduit and mounting, sunk to its proper position, and embodying my improved construction, said mounting being of the double deck type.

Figure 2 is a transverse sectional view of the conduit and showing a mounting for a single deck pipe line positioned therein.

Figure 3 is a plan view of the mounting member.

Figure 4 is a side elevation of a section of conduit constructed in accordance with my invention.

Figure 5 is a view similar to Figure 2 but illustrating a mounting of my improved type embodying a double deck structure, this view being taken along the line 5—5 and in the direction of the arrows indicated in Figure 6.

Figure 6 is a sectional side view taken along the line 6—6 and in the direction of the arrows indicated in Figure 5.

Figure 7 is a view corresponding to Figure 6 but showing the disposition of the parts when a larger size of pipe line is to be accommodated than that illustrated in Figures 5 and 6, and Figure 8 is a perspective view of a detail of the mounting.

As has been illustrated in Figure 1, and referred to in the preamble of this specification, my invention relates to a conduit 10, which is usually sunk well below the level of the ground 11, and provides a tunnel for the reception of pipe lines 12 supported by a suitable mounting referred to generally as 13, drainage being provided by a suitable drain pipe 14 positioned below the conduit, and it is to this mounting member that my invention primarily relates.

Assuming that a single pipe line 14 is to be positioned within the conduit 10, as in Figure 2, it will be seen that according to my invention, the base 15 of concrete or other suitable material, is primarily provided, the upper face of which extends well into the conduit 10 and provides a flat upper face. Resting upon this face is a plate 16 which comprises the mounting member and serves to support the pipe line 14.

Referring to the detailed construction of this mounting member, it will be seen that the said plate is preferably formed with transversely extending grooves or corrugations 17, within certain of which a series of balls 18 are adapted to be positioned, it being noted that the said grooves preferably terminate short of the edges of said plate. Also for a purpose hereinafter specified the plate 16 is formed adjacent its ends with openings 19 which latter are used where the mounting is to be a multiple deck one. The balls 18 or other rolling members, as aforestated are mounted within the grooves 17 of the plate 16, and the pipe line 14 rests upon these movable members, it being noted that by virtue of this construction that any size of pipe may be accommodated by virtue of the fact that an operator may simply move the rolling members closer towards, or further away from each other, to properly accommodate any size of pipe.

Assuming as in Figures 5 and 6, that a double deck mounting is to be provided for two series of pipe lines, it will be seen that a bridge is employed in addition to the plate 16. This bridge is, in the embodiment illustrated, in the nature of a U-shaped element comprising a horizontally extending body portion 20, and downwardly projecting arms 21 formed with reduced end portions 22. The upper face of the horizontally extending body portion 20 is corrugated or grooved as at 23 similar to the grooves or corrugations 17, and also rolling elements such as balls 24 are positioned within these portions, and serve to support pipe lines of any desirable circumference, as has been well brought out in the figures aforementioned. It will thus be understood that in the construction of Figures 5 and 6 that the reduced end portions 22 of the arms 21 extend through the openings 19 of the plate 16 thus forming a double unit mounting, which will support two pairs of pipe lines in such a manner that the same are free to move longitudinally, it being further appreciated that by virtue of this construction that it will not be necessary for a supply house to carry a great number of sizes and styles of mountings, in that the plate 16 in each instance forms a base of the mounting to which a bridge shaped element is added to provide a multiple deck mounting. In this connection it will be seen, as illustrated in Figure 2, that if it is desired, spurs 25 may form a part of, and extend downwardly from the lower face of the plate 16, and these spurs co-operate with the concrete mass 15, and will obviously preclude any displacement of the plate.

Attention is further invited to the fact that contrary to the conventional construction, and as illustrated in Figures 4, and 5, I preferably provide the opening 26 in the conduit 10, at points between the end portions thereof. I have found by this construction that the danger of damage to the conduit in shipment and handling is reduced to a minimum in that the edges of the opening are protected by the body of the conduit extending to both sides thereof, contrary to the conventional construction in which the opening is provided adjacent the end portions of the conduit. Also I have found that by providing the opening in the position aforementioned that the base 27 shown in Figures 5, 6 and 7 may be materially smaller, due to the fact that the size of the opening is diminished. This construction permits of the opening being more effectually plugged to preclude leakage, and also materially reduces the expense involved.

Finally, assuming that it is found that the lowermost layer of pipes, illustrated in Figures 5 and 6, should be of such a circumference as to be incapable of accommodation between the bridge and the plate 16, I preferably utilize a shim 28, as has been illustrated in Figure 8. This shim is provided with a central opening 29 corresponding in size to the openings 19 of the plate 16, and as has been illustrated in Figure 7, it is adapted to be interposed between the enlarged portions of the arms 21, and upper face of the plate 16, reduced portions 22 of the arms 21 being adapted to pass one through each of the openings 29 of the shims, thus providing a rigid structure in which, however, the bridging element will be materially elevated above the plate 16 and will thus be capable of accommodating a much larger size of pipe line, as has been shown in Figure 7.

Thus all the objects set forth in the preamble of this specification, have been accomplished, and it will further be understood that numerous modifications of structure might readily be resorted to without in the least departing from the spirit of my invention, which I claim as;

1. A mounting for pipe lines, comprising in combination a flat plate having a plurality of parallel grooves in its upper face, a base support for said plate on which it may be placed with the grooves parallel to the axis of the pipe line to be supported, and a plurality of balls adapted to roll in any of the said grooves, whereby suitable ball bearings for pipes of different diameters can be secured by placing the said balls in the proper grooves.

2. A mounting for pipe lines in conduits comprising, in combination, a flat plate, antifriction bearings for the pipe located on the upper surface of the plate, a foundation for the plate located in an opening in the bottom of the conduit, an inverted U-shaped bridging element removably mounted on said plate and interlocking therewith, and antifriction bearings for other pipe lines on the upper surface of said bridging element.

3. A mounting for pipe lines, comprising in combination a flat plate having a plurality of parallel grooves in its upper face and a projection on its underside, a base support for said plate on which it may be placed with the grooves parallel to the axis of the pipe line to be supported, said base support consisting of a mass of concrete in which the plate projection is embedded and a plurality of balls adapted to roll in any of the said grooves, whereby suitable ball bearings for pipes of different diameters can be secured by placing the said balls in the proper grooves.

4. A conduit for pipe lines comprising the combination of a series of tubular sections, certain of which have openings in their under sides intermediate of their ends, a monolithic base of concrete set in each such opening and lying partly within and partly outside of said tubular section, a flat plate having a plurality of grooves on its upper face parallel to the axis of the conduit set in said base and a plurality of balls adapted to roll in any of said grooves, whereby suitable ball bearings for pipes of different diameters can be secured by placing the said balls in the proper grooves.

5. A mounting for pipe lines including a plate formed with openings adjacent its end, a bridging element, arms formed with reduced end portions associated with said bridging element, said reduced end portions being adapted to extend through the openings of said plates.

6. A mounting for pipe lines including a plate formed with openings adjacent its end, a bridging element, arms formed with reduced end portions associated with said bridging element, said reduced end portions being adapted to extend through the openings of said plates, and shims adapted to rest upon the upper face of said plate and to engage the normal part of said arms.

7. A mounting for pipe lines including a plate formed with openings adjacent its end, a bridging element, arms formed with reduced end portions associated with said bridging element, said reduced end portions being adapted to extend through the openings of said plates, shims adapted to rest upon the upper face of said plate and to engage the normal part of said arms, said shims being formed with openings corresponding substantially to the openings of said plate whereby the reduced end portions of said arms may extend through the openings in said shims and with aligning openings of said plates.

WILLIAM GEORGE KUEHN,